United States Patent [19]

Qvarnström

[11] Patent Number: 5,035,105
[45] Date of Patent: Jul. 30, 1991

[54] METHOD AND A DEVICE DESIGNED TO ARRANGE AND PACK SEEDLINGS

[75] Inventor: Bengt G. L. Qvarnström, Falun, Sweden

[73] Assignee: Stora Kopparbergs Bergslags Aktiebolag, Falun, Sweden

[21] Appl. No.: 578,297

[22] Filed: Sep. 6, 1990

[30] Foreign Application Priority Data

Oct. 11, 1989 [SE] Sweden .................................. 8903344

[51] Int. Cl.⁵ ........................ B65B 25/02; B65B 35/36; B65B 35/44
[52] U.S. Cl. ......................................... 53/448; 53/247; 53/543; 56/16.5; 56/16.6
[58] Field of Search ................... 53/448, 443, 497, 537, 53/543, 247; 56/16.5, 16.6

[56] References Cited

U.S. PATENT DOCUMENTS

| 3,397,504 | 8/1968 | Drennan | 53/448 |
| 3,553,926 | 1/1971 | Zwiacher et al. | 53/448 |
| 4,835,946 | 6/1989 | Hartness et al. | 53/543 X |
| 4,884,388 | 12/1989 | Ventura et al. | 53/537 |

FOREIGN PATENT DOCUMENTS

8006671-5 9/1980 Sweden .
8403593-0 7/1984 Sweden .

Primary Examiner—Horace M. Culver
Attorney, Agent, or Firm—Nixon & Vanderhye

[57] ABSTRACT

Method and device designed for arranging and packing plants and their respective root lumps. The method and device are employed in relation to plants which have grown in a seedling unit containing a large number of plants and soil lumps arranged in a plurality of rows and lines adjacent each other and in uniform rectilinear check pattern. After removal of void soil lumps containing no plants and soil lumps containing badly developed plants, the remaining healthy plants are gripped and placed in channels in the same pattern they were in in the seedling unit with a separate channel for each row. The plants are then conveyed in the channels from an input end towards an output end, and gaps between the plants are eliminated in the channels not later than upon reaching the output end. A certain number of plants so collected are then removed from the channels and placed in a transport container.

16 Claims, 10 Drawing Sheets

METHOD AND A DEVICE DESIGNED TO ARRANGE AND PACK SEEDLINGS

TECHNICAL FIELD

The present invention relates to a method and a device designed to arrange and pack plants and their root lumps, which plants have grown in seedling units, which contain a large number of plants and soil lumps, arranged in a plurality of rows and lines close to each other in a uniform, rectilinear check pattern, some of the soil lumps possibly missing a plant or only having a poorly developed plant due to a failed seed germination, a reduced growth or due to other circumstances, the empty soil lumps or the soil lumps having not healthy plants respectively being removed from the healthy plants, subsequent to which the packed healthy plants are placed in transport containers.

BACKGROUND OF THE INVENTION

A method and a device of this type are described in e.g. SE-8 403 593-0. According to this described practice the healthy plants and their root lumps are lowered by gripping means onto an intermediate platform, from which they are pushed into a measurement frame having a resilient stop, against which the root lumps are packed, until the measurement frame is filled with plants, and subsequently the contents of the measurement frame is pushed into a transport container. One problem, which cannot be eliminated according to this known practice, is due to the fact that the various rows of the seedling unit may contain varying numbers of empty root lumps or not healthy plants, some of the rows thus being completely packed, while the remaining rows never will be completely filled. Thus, the measurement frame and consequently also the transport container will not be completely packed, which results in a transport economy-loss. Also, a faultless piece rate for the planting work is made more difficult. Also, a disarray in the transport container easily develops, which probably is an even worse disadvantage. If the plants are not close-packed, some of them may easily fall over and be damaged or damage adjacent plants.

Another problem, which cannot be solved according to known practice, is the arc-forming, which easily results, when the slightly conical root lumps are packed together. The plants and their root lumps "arch their backs" so to speak, which may result in that the plants are pressed upwards against the lid of the container and are damaged or fall in a lateral direction, which also is harmful.

BRIEF DESCRIPTION OF THE INVENTION

The object of the invention is to suggest an improved method and device of the type described above. This object and other objects can be attained in accordance with the characterizing features of the invention as set forth in the following patent claims. Additional characterizing features, advantages and aspects of the present invention are set forth in the following description of a preferred embodiment.

BRIEF DESCRIPTION OF THE DRAWINGS

In the following description reference is made to the accompanying drawings, in which.

DESCRIPTION OF A PREFERRED EMBODIMENT

Figure 1:
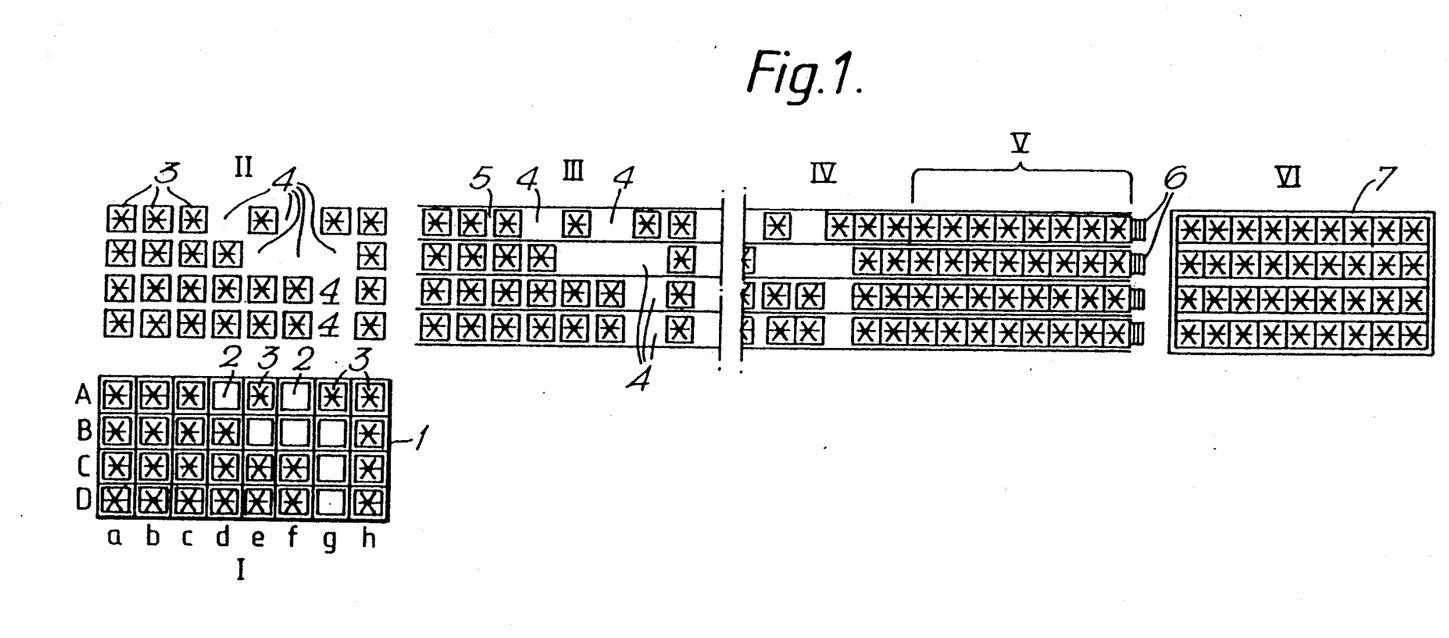
FIG. 1 shows schematically the basic principle of the present invention.

The basic features of the invention will be initially explained, reference being made to FIG. 1. A seedling unit 1 in area I contains a large amount of seedling pots, arranged in a rectilinear check pattern, in rows in the longitudinal direction of the unit and in lines in the cross-direction. In FIG. 1 only four rows A, B, C and D and eight lines a-h are shown. The actual number of rows and lines is much larger. Seedling unit 1 preferably is a unit of the type described in SE-C-420 456. In the illustrated example row A contains two empty root lumps 2, i.e. in seedling pots Ad, Af. Root lumps with healthy plants are designated 3. In row B the root lumps in seedling pots Be, Bf and Bg are empty and in rows C and D the root lumps in seedling pots Cg and Dg are empty.

All the root lumps 2 and 3 in all the rows A, B, C and D are ejected from seedling unit 1 by means of ejectors, not shown, but solely the healthy plants 3 and their root lumps are carried to area II by means of gripping means, not shown. Their relative position retains the same pattern as in seedling unit 1, i.e. where there previously were empty root lumps 2, there are now gaps 4 in the same positions.

The same carrier or other types of carriers subsequently carry plants 3 into and position them in conveyor channels 5. For every row A, B, C and D of plants a separate conveyor channel 5 is used. Plants 3 are still positioned with the same pattern as in seedling unit 1, i.e. still with retained gaps 4. From the input end, area III, plants 3 are subsequently carried in conveyor channels 5 towards an output area V. During this transport, in area IV, plants 3 are still positioned in the same pattern in relation to each other. Only when plants 3 approach output area V, i.e. when first line h hits plants of a previous seedling unit, which in the same way has been transported and arrived at output area V, the plants in rows A, B, C and D start to become closely packed together. This is done by keeping the conveyor means for the transport of the plants in said channels functioning and simultaneously preventing the plants by means of stop 6 from being conveyed further. Thus, through slipping between said conveyor means and said root lumps a packing of plants in area V will take place. Finally a certain number of the close-packed plants in output area V are removed, which corresponds to a certain length of close-packed rows of plants, and are transferred to a conveyor container 7.

Figure 2:
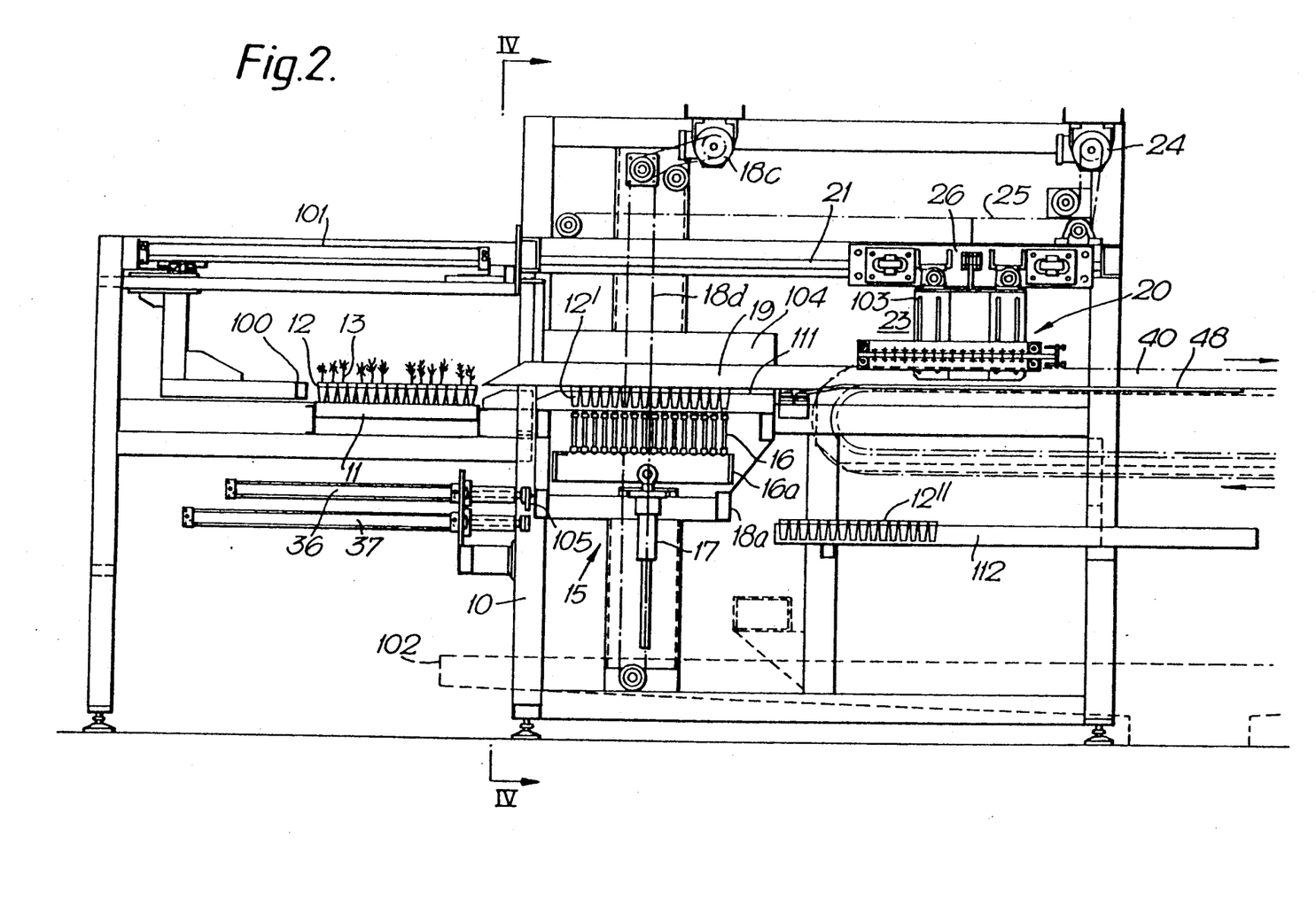
FIG. 2 is a lateral view of the input portion of an integrated machine designed to empty a seedling unit of its plants, remove empty soil lumps and not healthy plants respectively as well as to pack plants in transport containers.

The method and the equipment, which have been schematically described, reference being made to FIG. 1, can be carried out through a plurality of feasible embodiments. One embodiment will be explained infra in more detail, reference being made to FIGS. 2-9. In FIGS. 2 and 4 the areas, which are designated I, II, III, are shown and in FIG. 2 a portion of transport area IV is also shown.

A machine support generally is designated 10. To the left of the machine support a conveyor 11 is provided for feeding a seedling unit 12 in the cross-direction, i.e. perpendicularly to the plane of the drawing. Seedling unit 12 is filled with plants 13 and their root lumps 14, arranged in rows and lines in a rectilinear check pattern in the same way as shown in FIG. 1 but the number being considerably larger. Seedling unit 12 is pushed into the machine by means of a feeder 100, which is operated by means of a pneumatic cylinder 101, to an ejector area 15 within the left portion of machine support 10. By means of plungers 16—one plunger 16 for every seedling pot in seedling unit 12—root lumps 14 and their respective plants 13 are upwardly removed from seedling unit 12. The vertical movements of plungers 16 are performed by a hydraulic cylinder 17, mounted on an elevator 18a, the piston stem of which is attached to a carrier 16a, on which plungers 16 are mounted. Elevator 18a comprises a grating, which allows loose particles, e.g. of peat, lump residues etc., to pass and be collected in a collecting vessel 102. Elevator 18a extends between two vertical rails 18b within machine support 10 and can be raised and lowered by a motor 18c via chains 18d.

Above seedling unit 12′ in ejector area 15 there are longitudinal vertical metal bars 19 between every row in the seedling unit and also on both sides of the seedling unit. These bars 19 keep the root lumps in place through friction and prevent the plants from falling in a lateral direction, when they are removed upwards from the seedling unit. There are other stronger bars 104 mounted above bars 19, which are used as supports for said first bars 19 and prevent the seedling unit from being pushed upwards, warping bars 19, when plungers 16, which jointly exert a large force, remove the root lumps from the seedling unit.

Within the frame of machine support 10, which corresponds to areas I, II, III in FIG. 1, a gripping unit 20 is mounted on a carriage 26, which is movable back and forth between two rails 21 on two longitudinal beams from a rear position in ejector area 15 to a front position, conveyor loading area 23, in the right portion of machine support 10, which corresponds to area III in FIG. 1. An electric motor 24 moves carriage 26 back and forth between rails 21 via a chain-transmission 25.

Gripping unit 20 contains the same number of gripping elements 27 as the number of lines in seedling unit 12. Each gripping element, FIG. 7, comprises three pins, which project horizontally and perpendicularly from three horizontal, longitudinal rails 28, 29 and 30.

Upper pins 31 are mounted on upper rail 28. Middle pins 32 are mounted on middle rail 29, which is movable, and lower pins 33 are mounted on lower rail 30, which like upper rail 28 is stationary. Gripping unit 20 is mounted on a bracket 103 and can be moved back and forth in a transverse direction by means of a pneumatic cylinder 103a on carriage 26, controlled by a guide 103b from an exterior position beside the seedling unit, according to FIG. 4, to an interior position above the seedling unit. In the latter position gripping pins 31, 32 and 33 are fixed by means of a holder 34, FIG. 4, which includes a hole for the end of each gripping pin.

Figure 8:
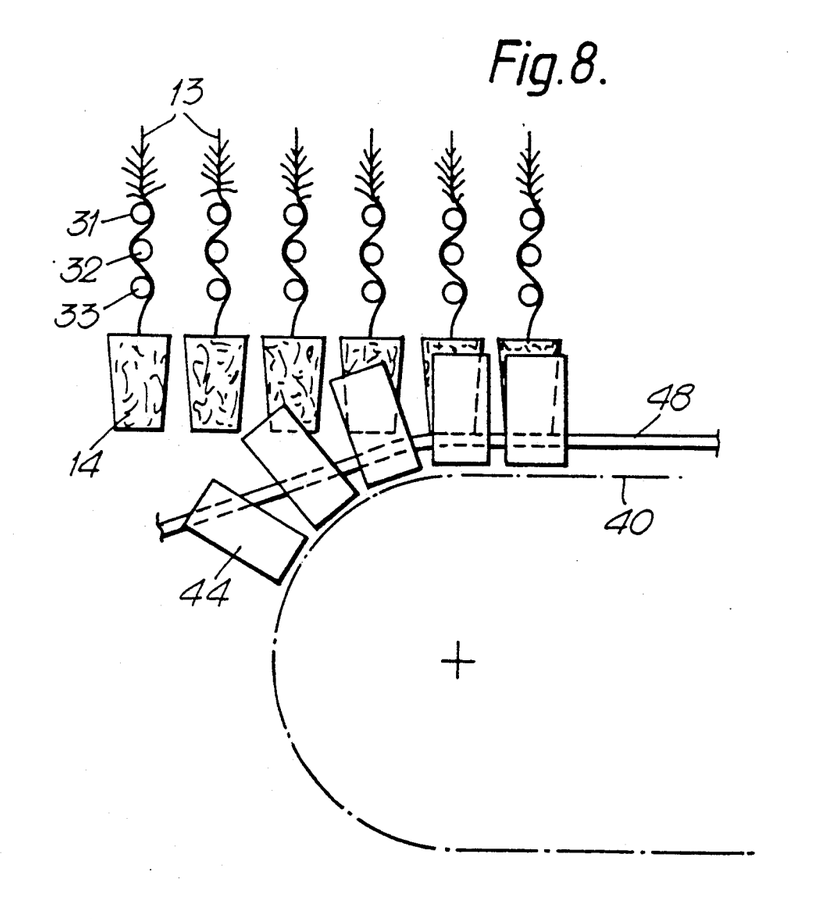
FIG. 8 shows schematically by means of a lateral view, how the plants, carried by the gripping means, are fed into the conveyor.
Figure 9:
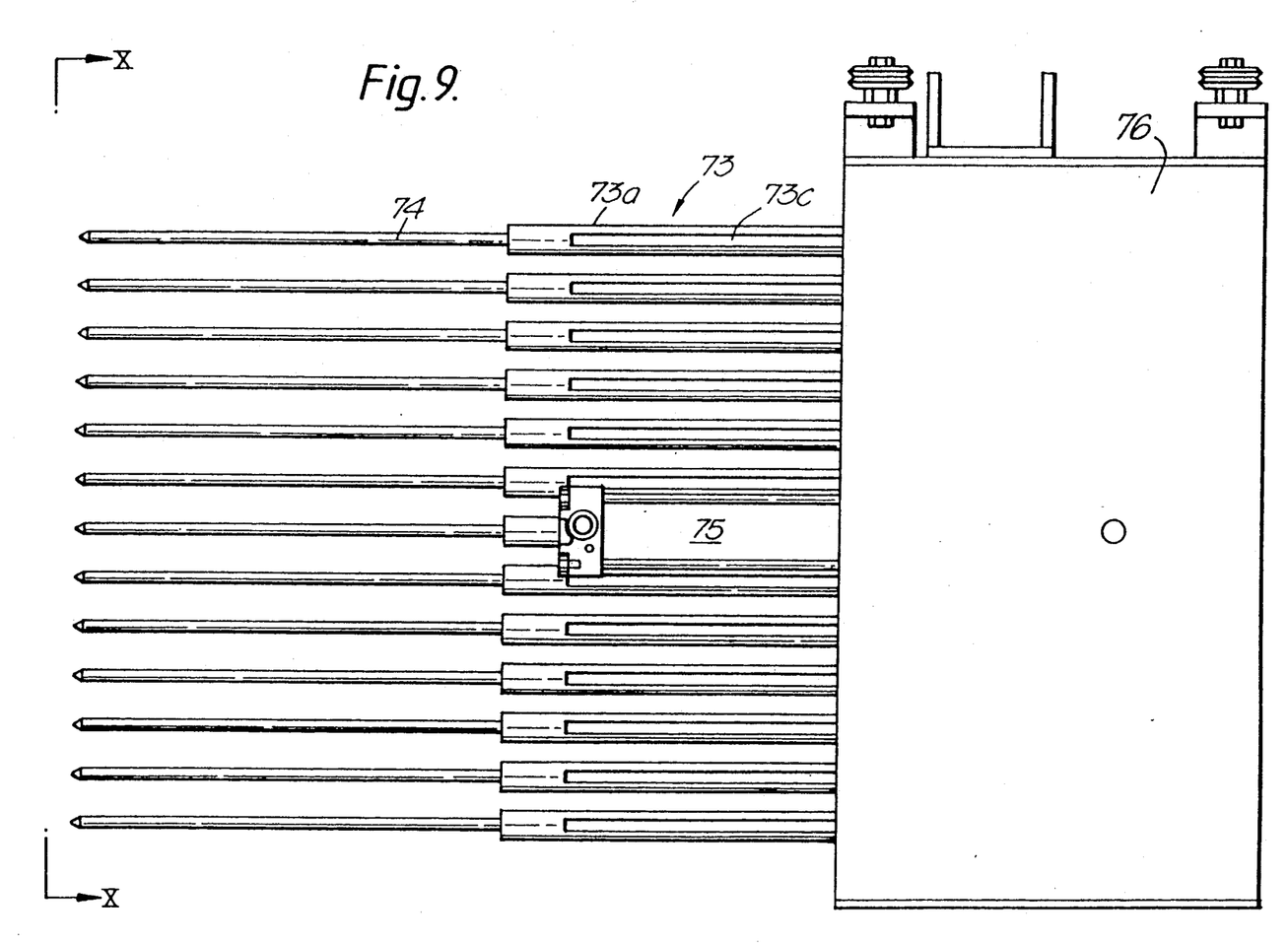
FIG. 9 is a plan view of a carriage, which is disposed in the output end and is provided with stop means used when the plants are packed.
Figure 10:
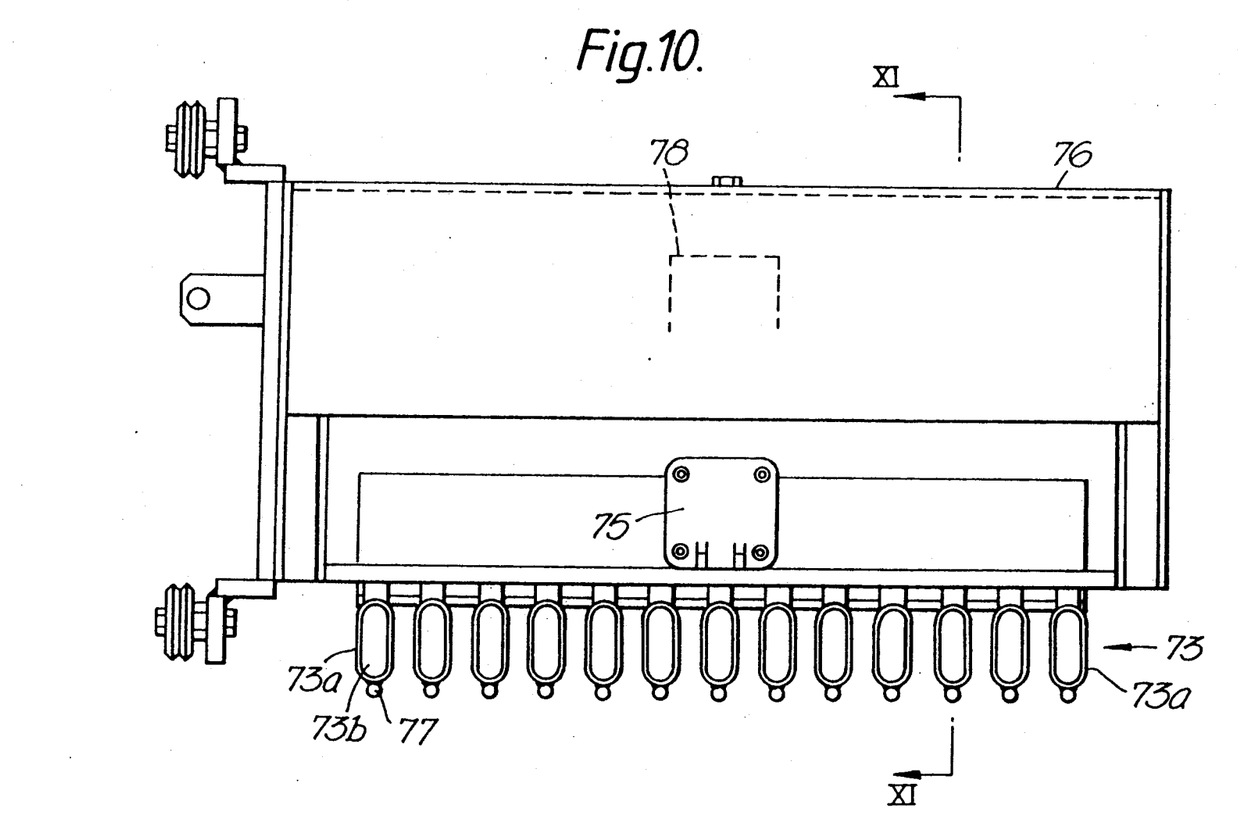
FIG. 10 is an end view along line X—X of FIG. 9.
Figure 11:
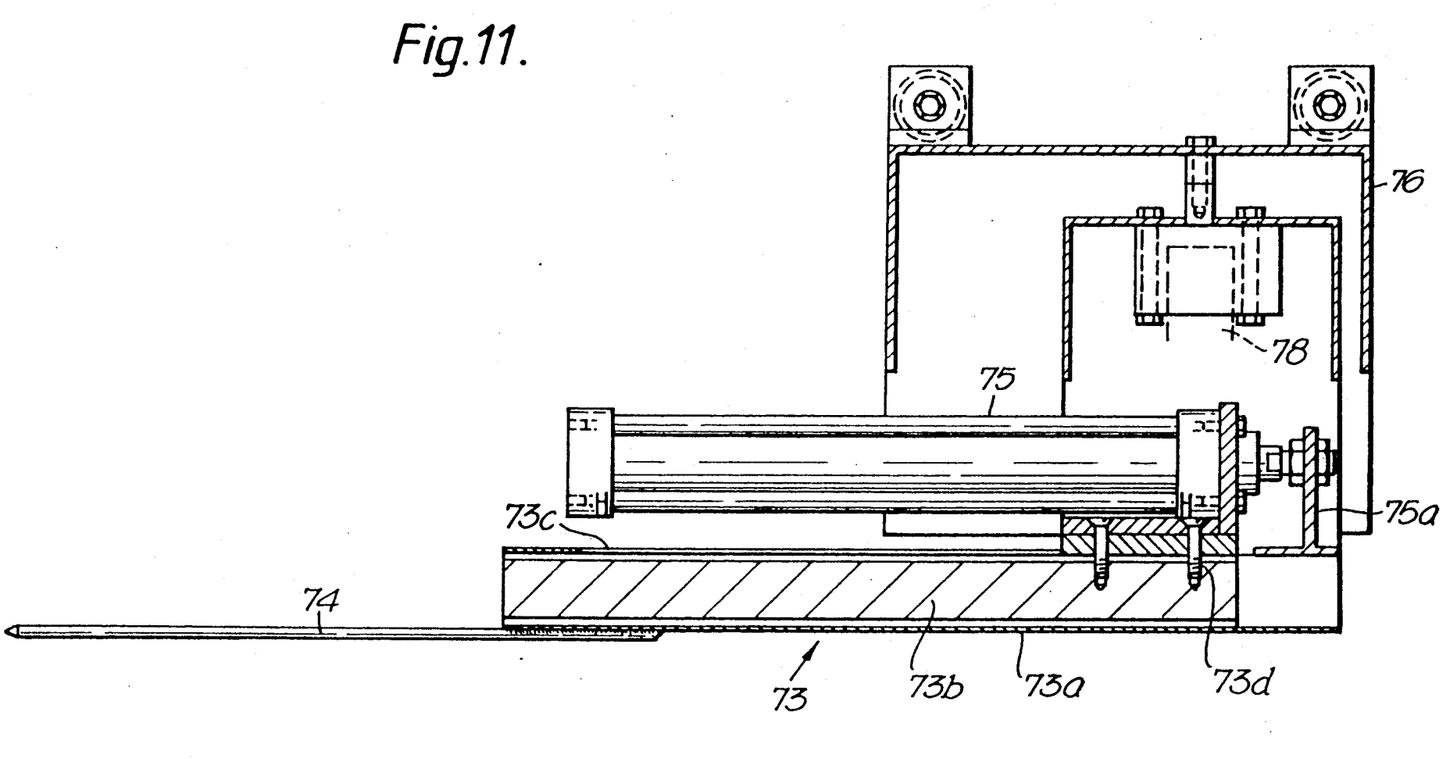
FIG. 11 shows a section along line XI—XI of FIG. 10.

The mode of operation of the equipment, described so far, will now be explained in more detail. A seedling unit is fed into the machine to ejector area 15 by means of feeder 100. The ejection of the plants and their respective root lumps in the seedling unit is carried out by plungers or ejector pins 16, which are moved from their lower position to their upper position by means of cylinder 17. Elevator 18a then is in its upper position. Gripping unit 20 is in its rear position above seedling unit 12′. Middle rail 29 is moved to the right, i.e. to a non-gripping position for the gripping pins. By means of ejector pins/plungers 18 the plants are removed upwards from seedling unit 12′ to such an extent, that root lumps 14 will be disposed between rails 19, which prevent them from falling in a lateral direction, while the plant above the root lump projects above the upper edge of rails 19. Gripping unit 20 is now moved into the transversal direction, pins 31, 32 and 33 reaching holder 34, subsequently to which the gripping unit is backed about 20 mm in order to straighten up possibly inclined plants. Holder 34 joins in this movement by means of a pneumatic cylinder, not shown. Middle rail 29, FIG. 8, is now moved to the left, middle pins 32 in cooperation with upper pins 31 and lower pins 33 gripping the plants. The middle row of holes of holder 34 participates in this movement. Gripping unit 20 and the plants suspended in gripping elements 27 are subsequently moved in the longitudinal direction by means of motor 24 into conveyor loading area 23, the root lumps sliding in the channels between rails 19. During this movement rails 19 are vibrated by means of a vibrator, not shown, which facilitates the transport, while the vibration results in that empty root lumps come loose and drop to the empty unit, which is supported by a number of longitudinal rails 111 between the seedling pots in the seedling unit. These rails 111 form the upper portion of elevator 18a.

When gripping elements 27 of gripping unit 20 have gripped the plants motor 18d moves elevator 18a and ejector pins 16 to a middle position. The empty root lumps, which do not contain any plants, as well as root lumps with badly developed plants, which could not be gripped by gripping elements 27, remain lying on the empty unit. These residues are scraped by means of a scraper 105, which is moved in a horizontal direction by means of an upper pneumatic cylinder 36, FIG. 2. Ejector pins/plungers 16 are now removed from unit 12′ and return by means of cylinders 17 to their lower position. Subsequently the downward movement of elevator 18a and ejector pins 16 continues to a lower position, in which empty seedling unit 12″ is ejected by means of a lower pneumatic cylinder 37 to a conveyor 112, while ejector pins 16 are rinsed with water, subsequent to which elevator 18a and ejector pins 16 return to their upper position, FIG. 2, which is the starting point for the feeding of a new seedling unit 12 to ejector position 15 in the machine. Water and substrat residues are collected in vessel 102 and are disposed of. Empty units 12" are transported away on conveyor 112.

The equipment required to transport the healthy plants from loading area 23, which corresponds to area III in FIG. 1, to the packing area, which corresponds to area V in FIG. 1, will now be explained, reference being made to FIGS. 2, 3, 6, 7 and 8. The transport means is an endless so called apron conveyor 40, FIG. 6, which extends in a horizontal direction between rear and front pulley wheels 41, 42. Conveyor 40 is driven by an electric motor, not shown, in clockwise direction —referring to FIG. 2 and 3—with mainly the same speed as gripping unit 20 is moved forwards from its rear to its front position by means of motor 24. Apron conveyor 40 includes plates 40a, transverse in a way known per se and connected to each other by two drive chains 40b. Such a chain is shown schematically in FIG. 7. Along the entire length of apron conveyor 40 profile elements 44, particularly designed according to the invention, are arranged in rows and lines. One line of such elements is disposed on each one of plates 40a. The number of elements in each line corresponds to the number of "pots" in each line in seedling unit 12. Also, elements 44 are mounted on the plates in such a way, that their symmetry lines will be aligned with rails 10 of ejector area 15. Between the rows of profile elements 44 channels 45 are formed, which have a width which corresponds to the width of a soil lump 14. Thus, in channels 45 soil lumps and their respective plants can be placed and conveyed, and in the space between two opposite profiles 44 in adjacent rows of profiles a soil lump and its plant can be placed.

In the foot area of each profile 44 there is a cavity 46. In this cavity there is a screw head 47 of a screw designed to attach profile elements 44 to plates 40a. Between adjacent profile elements 44 in each row there is a gap 106, which is sufficiently wide to avoid that roots or other parts of the plant are squeezed between elements 44. At the bottom of each channel 45 there is a solid rod 48, which extends from the input end to a point past at least half the length of the transport distance between pulley wheels 41, 42. Profiles 44 taper upwards and the contour of channels 45 corresponds roughly to the conicity of root lumps 14.

Apron conveyor 40, described in this way, and its interaction with gripping unit 20 operate in the following way. (Instead of an apron conveyor also other endless conveyors of course can be used, e.g. a belt conveyor, on which profile elements 44 can be mounted in the same way.) The conveyor is driven in clockwise direction by means of its motor, not shown, and drive chains 40b with a particular speed during the loading period. When plates 40a of conveyor 40 are passing rear pulley wheel 41, elements 44 will be projecting radially outwards, standing out in the way shown in FIG. 8. Simultaneously plants 13 and adhering root lumps 14 are carried forwards in a horizontal direction, suspended in gripping elements 27 of gripping unit 20. Thus, as conveyor 40 moves forwards, gripping unit 20 follows it and successively channels 45 are filled with root lumps. A few root lumps can then end up in the spaces between adjacent elements 44 in the rows of profile elements, i.e. in the areas of gaps 106, which does not obstruct the functioning. However, in some areas there will be gaps by analogy with what has been described supra, referring to FIG. 1. Gaps 47 prevent parts of plants from being squeezed between elements 44, when they are passing pulley wheel 41. Thus, when all the plants from a seedling unit have been loaded into channels 45 in conveyor 40, the conveyor as well as gripping unit 20 stop. Gripping elements 27 are opened up, when middle rail 29 returns to its starting point carrying its respective gripping pins 32. The entire unit 20 subsequently is moved in a lateral direction by means of cylinder 103a, FIG. 4. In this way apron conveyor 40 is filled with plants in repeated cycles, while the plants as well as possible gaps gradually are fed forwards by means of the conveyor.

Solid rod 48, which is placed at the bottom of each channel 45, has two tasks. When plants with their root lumps 14 are carried forwards by means of apron conveyor 40, the root lumps slide during the first period of this transport on rods 48. Due to the friction between the root lumps and rods 48 the bottom part of the root lumps are braked somewhat, and in this way the root lumps tend to tilt slightly forwards in the transport direction. In this way a possible tendency of the root lumps of jointly forming arcs ceases, which tendency is caused by the conicity of the root lumps, i.e. the root lumps will not, as they are being packed in the output end of the conveyor, be disposed in a fan-shaped way. This can also be called "back-arching". The influence of rods 48 can be controlled by adjusting the elevation of the rods in a suitable way. If rods 48 are designed in such a way, that their elevation gradually increases in the transport direction (not shown in FIG. 2), that result is attained that the root lumps come loose from their engagement with the interior sides of the profile elements, which facilitates the subsequent elimination of the gaps of the plant rows in the output end of the conveyor.

The equipment required to pack the plants and their root lumps and to place the packed plants in the transport direction, which corresponds to areas V and VI in FIG. 1, will now be explained in more detail, referring to FIGS. 3, 5, 9, 10 and 11. By the front portion of the equipment is to be understood, referring to FIG. 3, that portion which is disposed at the extreme right and consequently by the rear portion that portion which is disposed at the extreme left in FIG. 3. In the rear portion firstly there is a first gate 60, comprising a plurality of vertical pins, which can be moved in the vertical direction by means of an air cylinder 61. Above the center line of each channel 45 there is at least one vertical pin, which with its lower part 62 can be lowered into the respective channel 45 in order to form a stop for the movement of root lumps 14 in channels 45. However, this first gate 60 can not be moved in the longitudinal direction of the machine and consequently is called a stationary gate.

Figure 3:
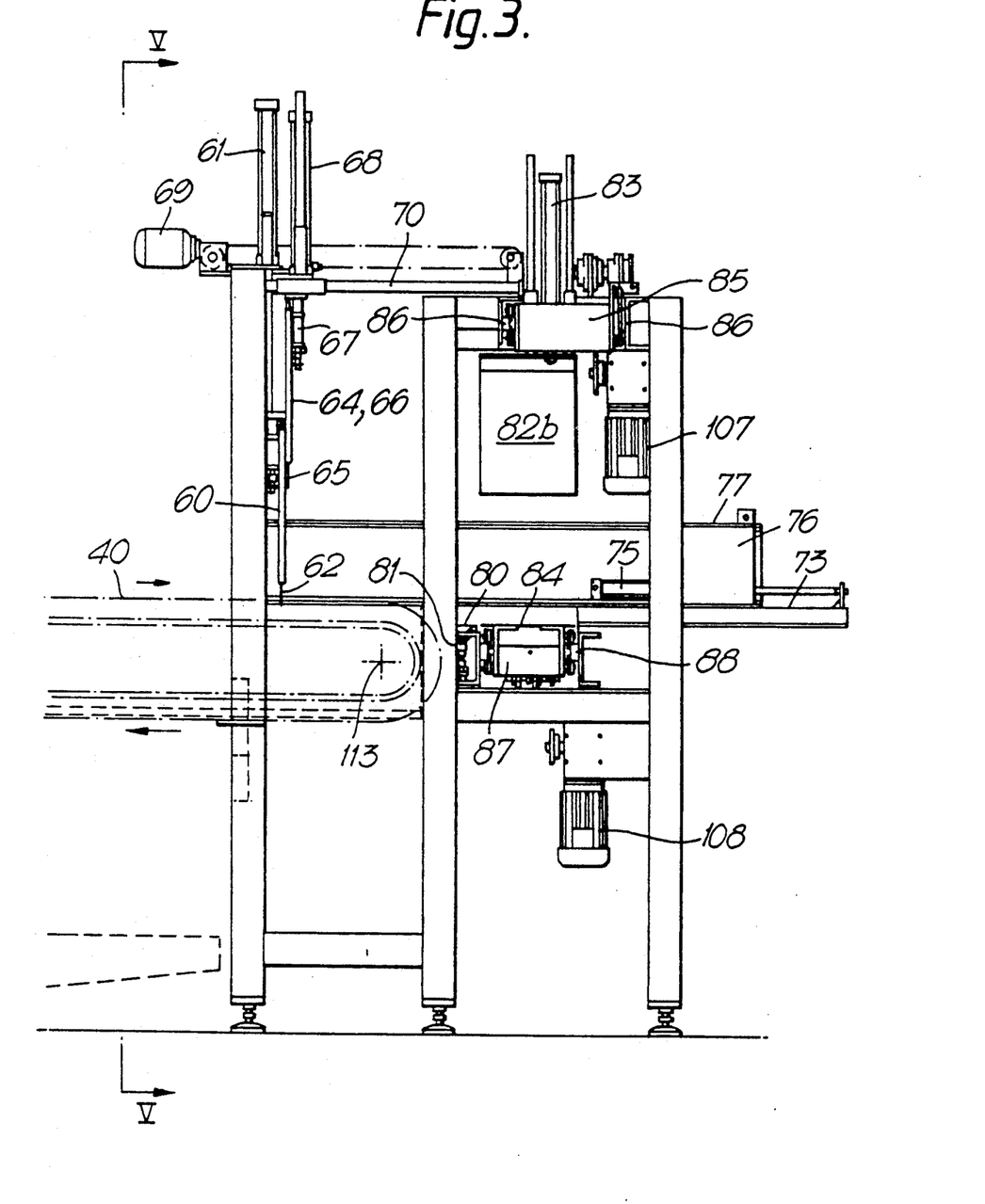
FIG. 3 is a lateral view of the output portion of the same machine and shows more clearly the equipment designed to pack the plants and to place them in transport containers.
Figure 4:
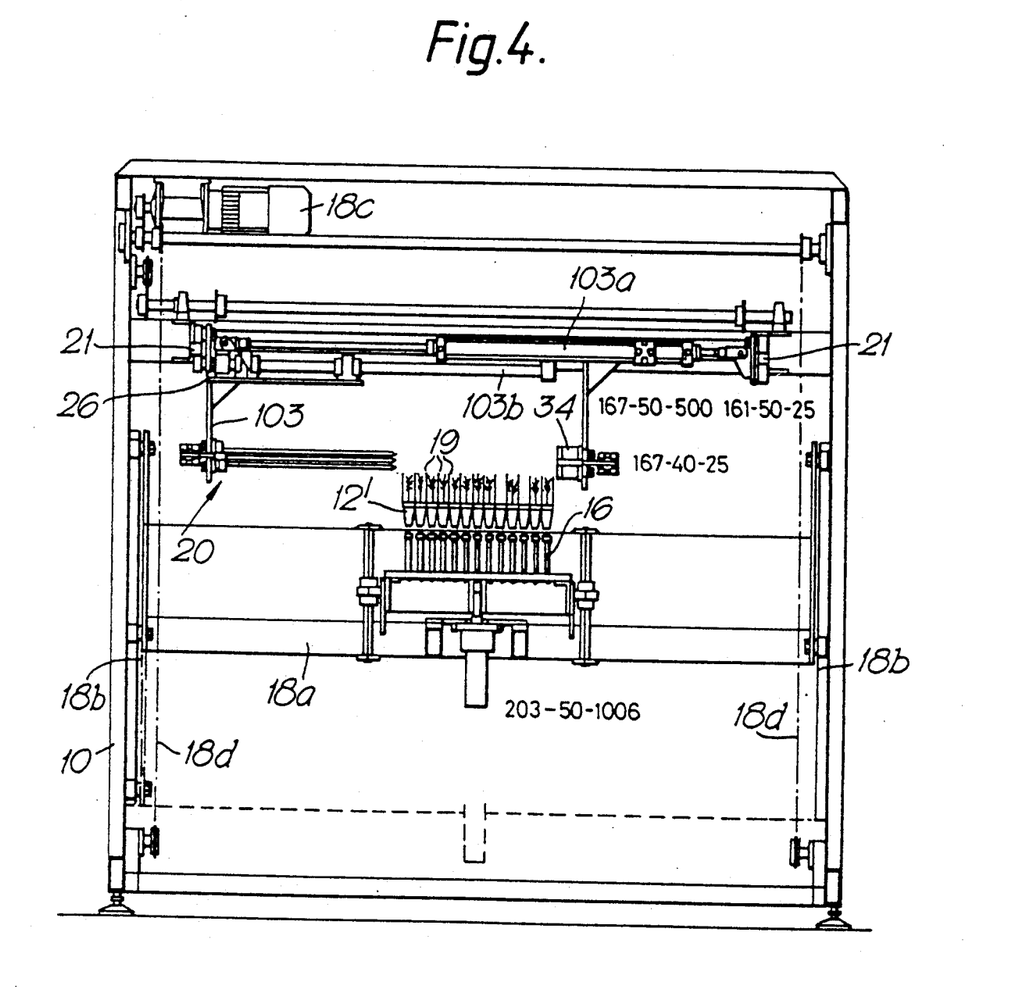
FIG. 4 is an end view along line IV—IV of FIG. 2 of the input portion of the machine.

In front of stationary gate 60, i.e. to the right of it, referring to FIG. 3, a moveable gate 64 with bottom pins 65 is disposed. There is a wiper sleeve 66 around each pin, which sleeve can be moved in a vertical direction by a common pneumatic cylinder 67. Gate 64 can be moved in a vertical direction by a pneumatic cylinder 68 and in a longitudinal direction by an electric motor 69 along two guides 70. Consequently second gate 64 is called a movable gate. Movable gate 64 is shown to the left in its rear fully raised position.

When a group of packed plants are transferred to a bottom plate, on which the pack will be fed into its cardboard box, movable gate 64 with its bottom pins 65 is used as a rear stop for the packed plants, i.e. retains the rear front line during the movement of the plant pack on to said bottom plate. The means which are used as a stop during the packing and as a front stop for the plant pack during the movement will be described with reference to FIGS. 9-11. A plurality of stops (the same number as the number of channels 45 in apron conveyor 40) are generally designated 73. Stops 73 are horizontally disposed and each stop comprises an oval sleeve 73a, a plastic rod 73b, which is telescopically mounted in the sleeve and essentially fills up sleeve 73a, and a horizontal spear 74, which is welded to the bottom side of sleeve 73a and turned towards apron conveyor 40. The exterior dimension of sleeve 73a allows stops 73 to be housed in and essentially fill up channels 45. Stops 73 are mounted on a carriage 76, which can be moved towards and away from apron conveyor 40 on rails 77 between a rear position and a front position. An electric motor, not shown, is used as a drive means. A horizontal pneumatic cylinder 75 is stationarily mounted on carriage 76 and plastic rods 73b are also stationarily mounted on carriage 76. The piston stem of cylinder 75 is, via a transverse rail 75a, attached to the front ends of sleeves 73a, i.e. the ends to the right with reference to FIGS. 3 and 11. The unit which comprises stops 73 with spears 74 and cylinder 75 can also be raised vertically a short distance by means of a pneumatic cylinder, schematically shown by 78 on carriage 76. In order to allow a telescopic movement between sleeves 73a and plastic rods 73b sleeves 73a are provided with an upper longitudinal groove 73c, and through this groove 73c retaining screws 73d are inserted, by means of which plastic rods 73b are fastened to carriage 76.

Figure 5:
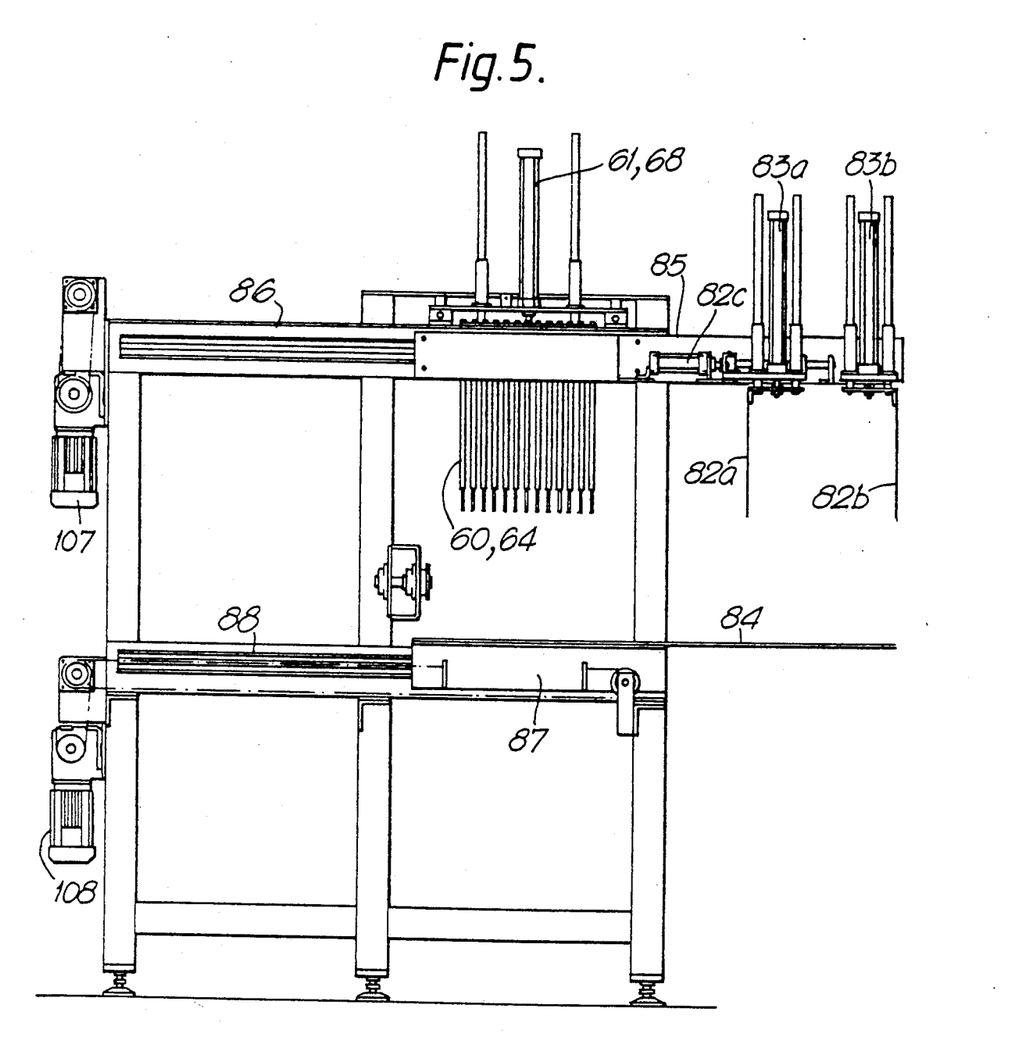
FIG. 5 is a view along line V—V of FIG. 3 of the output portion of the machine.
Figure 6:
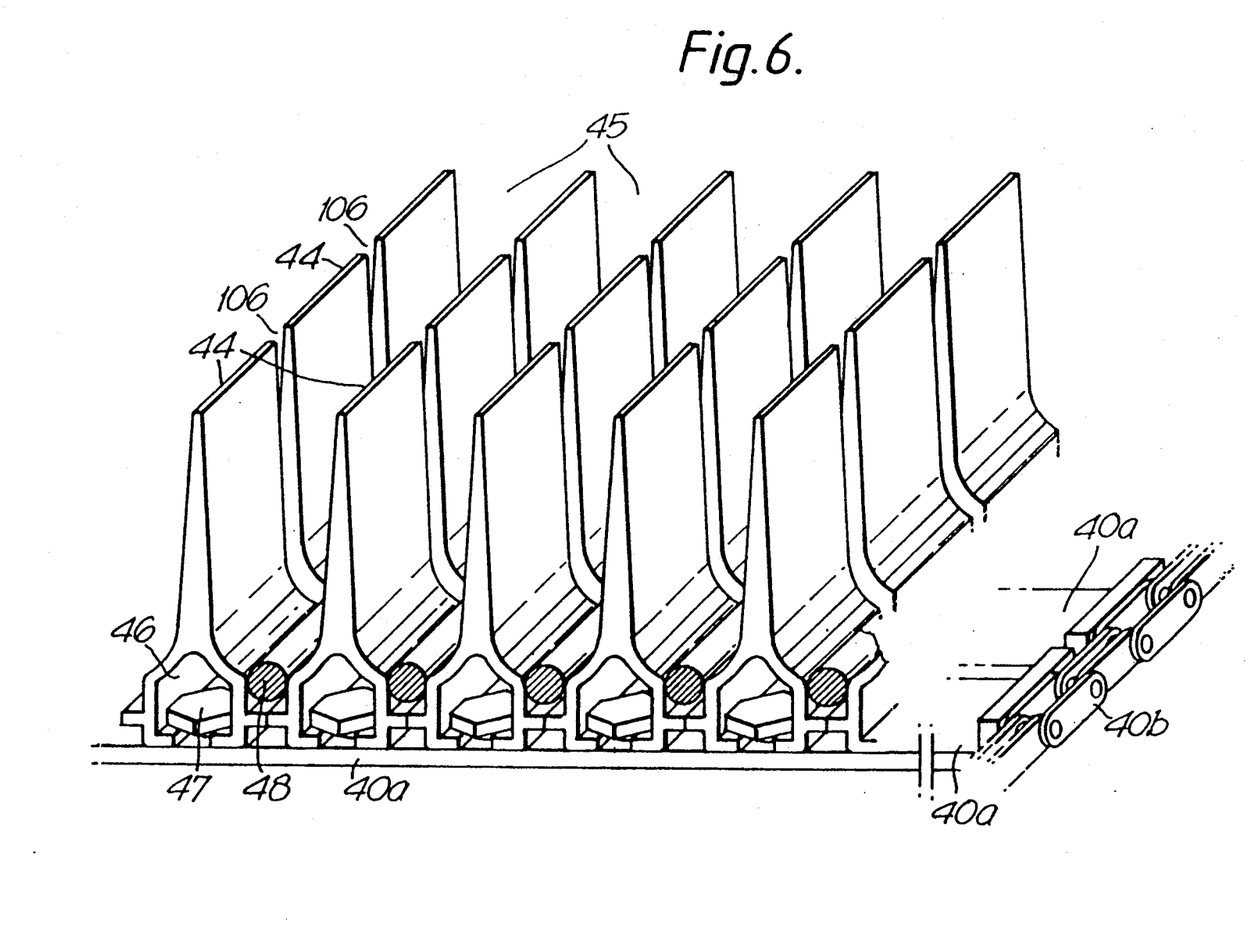
FIG. 6 is a perspective view, which shows more in detail how an apron conveyor, forming an integral part of the machine, is designed.
Figure 7:
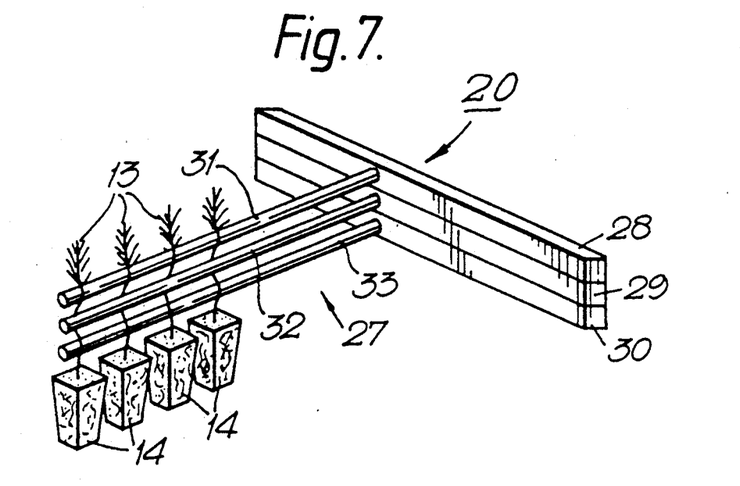
FIG. 7 is a perspective view, which shows how the gripping means, forming a part of the machine, operate.

The device according to the invention also comprises means designed to feed the packed plants into transport containers, corresponding to area VI in FIG. 1. These means are shown in FIGS. 3 and 5. In FIG. 3 a flap is designated 80. Flap 80 can be moved from a horizontal position to a vertical position by turning it about a horizontal axis of rotation by means of a pneumatic cylinder 81. Two feeding plates, one on each side of the pack, which comprises packed plants and root lumps and will be placed in a transport container, are designated 82a and 82b. One of these plates, feeding plate 82a, can be moved towards and away from feeding plate 82b by means of a pneumatic cylinder 82c, FIG. 5. Feeding plates 82a and 82b can also be moved vertically by means of pneumatic cylinders 83a and 83b respectively. Also, the unit which comprises feeding plates 82a, 82b as well as their cylinders 82c, 83a and 83b can be moved transversly on a carriage 85, which can be moved on rails 86 by means of an electric motor 107. A bottom plate 84 is in a corresponding fashion mounted on a carriage 87, which can be moved on rails 88 and in a transverse direction by means of an electric motor 108 via a chain transmission.

The equipment described in this way, with reference to FIGS. 3, 5 and 9-11, is used in the following way, and it is possible to perform the packing of the plants, before they are placed in the transport container, according to two alternatives.

As a starting point is selected the moment when a cardboard box has been filled with plants. According to a first one of two alternative modes of operation stationary gate 60 has then been lowered, pins 62 functioning as temporary stops in channels 45 against the root lumps, which are moved forwards by means of apron conveyor 40. The latter now is moved against stationary gate 60. Due to friction between root lumps 14 and the sides of channels 45, the profile elements of which are made of anodized aluminum, the plants will be pressed against stationary gate 60, all gaps in the channels gradually being eliminated. Since the plants have come loose somewhat by rods 48, described supra, this functioning is facilitated. The delay time interval for this initial closepacking of the plants is set in the automatics of the machine according to the known statistical gap frequency of the seedling units. Flap 80 is lowered. Stops 73 are moved rearwards by means of carriage 76, i.e. to the left with reference to FIG. 3, such a distance, that spear heads 74 reach and somewhat pass lowered stationary gate 80. Also, sleeves 73a and plastic rods 73b are displaced in relation to each other in such a way, that the plastic rods with their ends reach a position immediately in front of stationary gate 60. Stationary gate 60 can now be raised and subsequently carriage 76 is moved to the right, FIG. 3, carrying plastic rods 73b, while sleeves 73a and spears 74 are left in said rear position due to a relative movement between carriage 76 and sleeves 73a. Apron conveyor 40 is now moved forwards and concurrently carriage 76 is moved forwards. This movement continues, until plastic rods 73b have moved into sleeves 73a through a relative movement between the carriage and the plastic rods, until the front ends of stops 73 roughly are placed at the same level as center 113 of the front pulley wheel of the apron conveyor. When this position has been reached, the movable gate is lowered, the distance between the coinciding ends of the plastic rods/the sleeves and the movable gate determining the length of the plant pack. Stationary gate 60 is now lowered, the spears are raised and carriage 76 with stops 73 move to the input position, where the plants are collected on spears 74 above bottom plate 84. Sleeves 73a with spears 74 continue their movement forwards, to the right in FIG. 3, and in this way the plants fall onto bottom plate 84 while stopped by the ends of plastic rods 73b. The end of plastic rods 73b are then at the same level as the edge of bottom plate 84. Subsequently flap 80 is raised and the plants are squeezed between said flap and the ends of plastic rods 73b. Possibly adjacent the right edge of bottom plate 84 an additional flap can be used, in the same way as flap 80 but provided with recesses for stops 73.

Side plates 82a and 82b are now lowered. Bottom plate 84 and side plates 82a, 82b carry the plant pack into a transport cardboard box and subsequently bottom plate 84 is returned by means of carriage 87. Side plate 82b can now be raised and plate 82a squeeze the plant pack against one of the side walls of the cardboard box, the plant pack being squeezed in a lateral direction also, subsequently to which also plate 82a can be raised. Subsequently the two side plates 82a, 82b can return to their starting point. The filled cardboard box is transferred on a transport container, not shown.

According to the second mode of operation-alternative during the initial packing of the plants the two gates 60, 64 are initially raised, and the stops are moved forwards only into the same level as center 113 of the pulley wheel. An initial close-packing and an elimination of the gaps in channels 45 directly against stops 73 are obtained, but spears 74 have in this position nevertheless been moved forwards to a position roughly at the same level as stationary gate 60. Thus, when the packing is concluded, the two gates 60, 64 are lowered, movable gate 64 being lowered into a position, which gives the plant pack its desired length, subsequent to which the mode can continue in the way described above. The advantage with this second alternative is that it is time-saving. However, the first alternative may result in a greater security for a faultless front line of the plants, i.e. the risk of a tilting forwards of the plants in channels 45 is smaller. The length of the plant pack can also be adjusted by selecting the position of stops 73 exactly when the movable gate is lowered, in which case the movable gate can be lowered into a stationary position. Other combinations of the mutual modes of operation of the various elements are feasible within the scope of the inventive concept.

It should be realized that the invention can be modified within the spirit and scope of the appending claims. For example, instead of the provision of the solid rod 48 or as a complement to the rod, the distance between the rows of profile elements 44 may be provided to increase a few millimetres as the profile elements travel in the transport direction, i.e. such that the channels 45 widens a little along the transport direction, so that the roof lumps more readily will be loosened from the channels.

I claim:

1. A method for arranging and packing plants including their root lumps, said plants having been grown in a seedling unit containing a large number of plants and soil lumps arranged in a plurality of rows and lines adjacent each other in a uniform rectilinear check pattern, wherein some of said soil lumps may be void of any plant or may contain only a badly developed plant due to failed seed germination, reduced growth or other circumstances, said method comprising the steps of:

removing any of said void soil lumps and soil lumps containing only badly developed plants from said seedling unit;

gripping the remaining healthy plants;

placing said gripped healthy plants in channels in the same pattern they had with respect to each other in said seedling unit, with a separate channel for every row;

conveying said plants in said channels from an input end to an output end;

eliminating gaps between said plants in said channels not later than at said output end;

removing from said channels a certain number of plants so collected, the number removed corresponding to a certain length of said channels at said output end; and placing said removed plants in a transport container.

2. A method according to claim 1, wherein said gaps are eliminated by moving said plants in said channels against stops mounted in said channels at said output end.

3. A method according to claim 2, wherein said channels are movable and said plants are conveyed in said movable channels.

4. A method according to claim 3, wherein said gaps are eliminated by the action of friction between interior sides of said channels and said root lumps upon movement of said channels in relation to said stops.

5. A method according to claim 1, wherein said plants are close packed in a longitudinal direction subsequent to removal from said channels.

6. A method according to claim 1, wherein said root lumps are tilted forwards in said channels in order to avoid arc-forming during close packing in said channels.

7. A method according to claim 1, wherein said root lumps are urged upwards out of said channels during transport in said channels in order to loosen said root lumps from engagement with said channels.

8. A device for arranging and packing plants including their respective root lumps, which plants have grown in a seedling unit containing a large number of plants and soil lumps arranged in a plurality of rows and lines adjacent each other in a uniform rectilinear check pattern, wherein some of said soil lumps may be void of any plant or contain only a badly developed plant due to a filed seed germination, reduce growth or other circumstances, said device comprising:

gripping means for gripping and placing healthy plants and their respective root lumps in the same pattern with respect to each other as they had in said seedling unit;

transport channels having a separate channel corresponding to each row of said seedling unit;

conveying means for transporting said plants in said transport channels from an input end to an output end;

gap elimination means for eliminating gaps between said plants by bringing said plants together in a longitudinal direction of said rows in said channels not later than at said output end; and removing means for removing said plants from said channels and placing them in a transport container.

9. A device according to claim 1, wherein said transport channels are movable.

10. A device according to claim 9, wherein said transport channels are mounted on an endless conveyor.

11. A device according to claim 10, wherein said transport channels comprise rows of profile elements mounted close to each other such that parts of the plant or root lumps are not squeezed therebetween and such that the profile elements can pass pulley wheels of an endless conveyor.

12. A device according to claim 8, wherein said gap elimination means includes stops mounted in said transport channels at said output end, said stops and said transport channels cooperating to bring said plants together against said stops in said channels.

13. A device according to claim 12, wherein said stops comprise an exterior part, an interior part and an elongated bottom element mounted on said exterior part, said exterior and interior parts being telescopically movable in relation to each other horizontally towards and away from said channels, said bottom element being designed to be introduced into a bottom region of said channels in order to lift said plants upwards from said bottom region.

14. A device according to claim 8, and further including tilting means mounted in a bottom region of said channels for tilting said root lumps forwardly, when said plants are being conveyed in said channels, in order to avoid arc-forming between said root lumps.

15. A device according to claim 8, and further including lifting means mounted in a bottom region of said channels for moving said root lumps upwardly, when said plants are being conveyed into channels, in order to loosen said root lumps from engagement with said channels.

16. A device according to claim 14, wherein said tilting means also functions to move said root lumps upwardly in order to loosen said root lumps from engagement with said channels as the plants are conveyed in said channels.

* * * * *